(12) United States Patent
Homm et al.

(10) Patent No.: US 7,428,684 B2
(45) Date of Patent: Sep. 23, 2008

(54) DEVICE AND METHOD FOR CONCEALING AN ERROR

(75) Inventors: Daniel Homm, Erlangen (DE); Ralph Sperschneider, Erlangen (DE)

(73) Assignee: Fraunhofer-Gesellschaft Zur Forderung der Angewandten Forschung E.V., Munich (DE)

( * ) Notice: Subject to any disclaimer, the term of this patent is extended or adjusted under 35 U.S.C. 154(b) by 698 days.

(21) Appl. No.: 10/976,540

(22) Filed: Oct. 29, 2004

(65) Prior Publication Data

US 2005/0144541 A1    Jun. 30, 2005

Related U.S. Application Data

(63) Continuation of application No. PCT/EP03/03607, filed on Apr. 7, 2003.

(30) Foreign Application Priority Data

Apr. 29, 2002    (DE) ................. 102 19 133

(51) Int. Cl.
*G06F 11/00*    (2006.01)
(52) U.S. Cl. ...................... 714/747; 714/776
(58) Field of Classification Search ........... 714/747, 714/776, 746, 779, 799; 375/240; 341/107
See application file for complete search history.

(56) References Cited

U.S. PATENT DOCUMENTS

| 5,852,469 A | 12/1998 | Nagai et al. ........... 348/384 |
| 6,104,754 A | 8/2000 | Chujoh et al. ........... 375/240 |
| 6,441,755 B1 * | 8/2002 | Dietz et al. ........... 341/50 |
| 6,892,343 B2 * | 5/2005 | Sayood et al. ........... 714/779 |
| 6,975,254 B1 * | 12/2005 | Sperschneider et al. ..... 341/107 |
| 7,003,448 B1 * | 2/2006 | Lauber et al. ........... 704/200.1 |
| 7,224,730 B2 * | 5/2007 | Kim et al. ........... 375/240.08 |
| 7,236,520 B2 * | 6/2007 | Kim et al. ........... 375/240.01 |

FOREIGN PATENT DOCUMENTS

| CA | 2 341 864 | 3/2000 |
| EP | 732 855 | 9/1996 |
| EP | 966 107 | 12/1999 |
| WO | WO 00/68934 | 11/2000 |
| WO | WO 01/43320 | 6/2001 |

OTHER PUBLICATIONS

Fraenkel, A. S. and S. T. Klein; Bidirectional Huffman Coding; Computer Journal vol. 33, No. 4, 1990.
Takishima, Y., M. Wada, and H. Murakami; Reversible Variable Length Codes; IEEE, 1995.
Zhang, Rui; Video Coding with Optimal Inter/Intra-Mode Switching for Packet Loss Resilience; IEEE, 2000.

\* cited by examiner

*Primary Examiner*—Guy Lamarre
*Assistant Examiner*—Fritz Alphonse
(74) *Attorney, Agent, or Firm*—Michael A. Glenn; Glenn Patent Group (57) ABSTRACT

A device for concealing an error in an erroneous or potentially erroneous information unit generates output values of a forward decoder and a backward decoder which differ and thus indicate an error-concealment area. The different values for one and the same information unit are examined with regard to a predetermined criterion so as to select that value which meets the predetermined criterion, i.e. which is plausible. Thus, an elimination or reduction of the continuation errors introduced in the decoding of blocks of reversible code words of variable lengths is achieved without impacting the compression rate.

25 Claims, 3 Drawing Sheets

DEVICE AND METHOD FOR CONCEALING AN ERROR

CROSS-REFERENCE TO RELATED APPLICATION

This application is a continuation of copending International Application No. PCT/EP03/03607, filed Apr. 7, 2003, which designated the United States, and was not published in English and is incorporated herein by reference in its entirety.

BACKGROUND OF THE INVENTION

1. Field of the Invention

The present invention relates to the transmission of data via an erroneous transmission channel, and in particular to a concept of concealing an error in an erroneous or potentially erroneous information unit which has been transmitted via the erroneous channel.

2. Description of Prior Art

In particular with audio and/or video coding there is a need to make the coding/decoding concepts robust against transmission errors. It has been known, in particular from wireless transmission technology, to perform a forward error correction (FEC) on the coder side. By means of this concept, a redundancy is introduced into the data stream by a coder. This redundancy may then be exploited in a decoder, e.g. using a Viterbi decoding block, so as to correct any transmission errors that developed in the transmission. This method is disadvantageous in that by adding a redundancy, the transmission rate via the channel is increased in the coder. Particularly with highly disturbed transmission channels, such as wireless transmission channels, however, there is often no alternative choice so as to enable reliable reception in the receiver/decoder with non-optimal channel conditions.

On the other hand, a main goal, especially with audio or video compression methods, is to compress audio or video data as highly as possible to enable a transmission via channels which are typically not highly disturbed, such as line-conducted channels, which allow a limited data rate. This is why such prior-art compression methods, as are standardized in the MPEG family, often utilize entropy codes for entropy-coding quantized data, such as spectral values. A known representative of an entropy-coding method is so called Huffman coding which enables coding of a set of values with a nearly minimum redundancy. Prior to assigning the Huffman code words to the individual information units, a statistic of the information units is determined so as to associate the most frequently occurring information unit with a code word having as short a length as possible, whereas an information unit which occurs very rarely is assigned a code word with a longer length (with regard to the number of bits).

Huffman codes are problematic in that one cannot see, from a data stream of Huffman code words, where a code word starts (aside from the first code word), and where a code word ends. A data stream of Huffman code words typically consists of a string of binary ones and zeros. A decoder decodes such a data stream of Huffman code words while knowing the table of codes on which the coding was based. The table of codes, which may also be represented as a code tree, is configured such that the end of a code word inherently results because the code is free from prefixes (in the code tree, only leaves are valid code words). The Huffman code has the characteristic that all "branches" of the tree are complete, i.e. lead to valid code words.

If during the transmission of such a data stream of Huffman code words a transmission error arises, this will almost inevitably mean that even though all code words have been decoded correctly up to the occurrence of the error, all code words are decoded in an erroneous manner after the occurrence of the error, which may relate to, e.g., only one bit. If a code is selected wherein all branches have been terminated with valid code words, the decoder will keep on decoding irrespective of the error and will not establish before the end of the data stream that somewhere further upstream an error has occurred, if for the last code words, the bits in the data stream run out or if any bits remain. Thus, the Huffman code as an example of an entropy code is favorable from the point of view of data rate compression. However, error robustness is minimal, since as little as one bit error in the very first code word is very likely to lead to the fact that all other subsequent code words will be recognized incorrectly by the decoder even though they have not been affected by the bit error.

A more error-robust approach has been described in U.S. Pat. No. 5,852,469. Instead of using Huffman codes, said U.S. patent suggests using reversible codes (i.e. codes which may be decoded on both sides) having code words of variable lengths (referred to below as reversible code words), such as symmetrical code words. These codes which in addition to the property of the freedom from prefixes also have the property of being free from suffixes, are also referred to as RVL (reversible variable length). Moreover, an additional backward decoder is used instead of the forward decoder which is sufficient for a Huffman decoder. The forward decoder performs a decoding from a starting point of a block of reversible code words of variable lengths, whereas the backward decoder becomes effective/starts from an end point of the block of reversible code words of variable lengths.

Reversible code words, such as symmetrical code words, may also have the property that they lead to a code tree wherein not all branches are terminated by valid code words. Therefore, it is during the course of the decoding already that a decoder will recognize whether an error has occurred, if the decoder comes across such an invalid code word, i.e. a code word not provided in the table of codes. However, the decoder cannot determine with certainty whether the error was located precisely in the code word which has been recognized as invalid. Since the number of valid code words of this table of codes is selected to be as small as possible for reasons of data compression, only a few invalid code words exist, so that a decoder may not come across an invalid code word until several code words after the occurrence of the transmission error in the bit stream. Therefore, an error in the bit stream leads to continuation errors which, however, do not relate to the entire remaining bit stream anymore, as they do with the Huffman code, but which typically propagate only via several code words after the occurrence of the error. For error limitation, the backward decoder is provided in addition to the forward decoder, which backward decoder will still output a few code words as seemingly correct code words in the backward direction, also due to the continuation errors, if it is assumed that only one bit error exists in the data stream. An error may be recognized if the forward decoder and the backward decoder output different decoded information units for information units of the same ordinal number.

Therefore, U.S. Pat. No. 5,852,469 suggests discarding all outputs in this error area and using only information units that have been coded, starting from the starting point of the block of code words up to the beginning of the error or overlap area, for receiver-side further processing, and using, in addition, decoded information units only which have been decoded from the end point of the block of code words up to the end (seen in the forward direction) of the overlap area.

DE 198 40 835 A1 also discloses a device and a method for entropy-coding information words, and a device and method for decoding entropy-coded information words. For information units decoded in the error or overlap area it is suggested to utilize an error concealment technique. Potential error concealment techniques consist in simply replacing an erroneous value by its adjacent, intact value. If both intact values which are adjacent to an error are known, weighted mean values from the left and right edges may also be used to artificially replace, i.e. conceal, the erroneous value. Further error concealment techniques that have been mentioned use interpolation using two adjacent values which have an error sandwiched between them. Similarly, a one-sided prediction may be performed from the front or from the back, relating to the overlap area, so as to replace an erroneous value by a value which is "possibly relatively intact".

A disadvantage of this concept is the fact that it is problematic if several successive information units have been affected by continuation errors. Interpolation or prediction-based concealing techniques in this case will very soon find their limitations, and the quality of the error concealment will decrease more and more strongly.

U.S. Pat. No. 6,104,754 discloses a moving-picture coder/decoder system using a coding with code words of variable lengths. What is worked with, in particular, are reversible code words of variable lengths which may be decoded from the front or from the back. If a forward decoder determines an error and if a backward decoder also establishes an error, the area including the two errors is discarded if it does not overlap. If, on the other hand, the area overlaps, what is taken is the output of forward decoder up to the error, excluding the error. From the error onwards, the output of the backward decoder is taken. Alternatively, the output of the backward decoder up to the error may also be taken, and then the output of the forward decoder from the error onwards. If an error is found only in the forward decoder, the output of the forward decoder up to the error is taken, and the output of the backward decoder from the error is taken. If both decoders determine an error in the same code word, the erroneous code word is discarded, the output of the forward decoder up to the error is taken, and the output of the backward decoder up to the error is taken.

DE 19959038 A1 discloses a method of decoding digital audio data, wherein error recognition is performed in dependence on reference values transmitted, preferably scale factors. Here, reference values of a frequency range are compared with previous reference values of the same frequency range so as to generate a feature which is compared with a threshold value. If the feature exceeds the preset threshold value, this is indicated by means of signaling. For error concealment, reference values marked as errors are replaced by previous reference values which have been stored.

SUMMARY OF THE INVENTION

It is the object of the present invention to provide an improved concept for concealing an error in an erroneous or potentially erroneous information unit.

In accordance with a first aspect, the invention provides a device for concealing an error in an erroneous or potentially erroneous information unit, the device having: forward-decoder for forward-decoding a block of reversible code words of variable lengths which represent a block of information units, the block of code words having a starting point and an end point, the forward-decoder being configured to decode the block in the direction of the end point, starting from the starting point; a backward-decoder for backward-decoding the block of code words, starting from the end point, in the direction of the starting point; a determinator for determining an error-concealment area, the error-concealment area being given by the forward-decoder providing a decoded forward-decoding value for the information unit, and the backward-decoder providing a decoded backward-decoding value for the information unit, the forward-decoding value and the backward-decoding value deviating from one another for one and the same information unit; and a selector for selecting the forward-decoding value or the backward-decoding value as an information unit, depending on which value meets a predetermined criterion, so that an error or a potential error in the information unit is concealed.

In accordance with a second aspect, the invention provides a method for concealing an error in an erroneous or potentially erroneous information unit, the method including the following steps: forward-decoding a block of reversible code words of variable lengths which represent a block of information units, the block of code words having a starting point and an end point, the forward-decoder being configured to decode the block in the direction of the end point, starting from the starting point; backward-decoding the block of code words, starting from the end point, in the direction of the starting point; determining an error-concealment area, the error-concealment area being given by the forward-decoder providing a decoded forward-decoding value for the information unit, and the backward-decoder providing a decoded backward-decoding value for the information unit, the forward-decoding value and the backward-decoding value deviating from one another for one and the same information unit; and selecting the forward-decoding value or the backward-decoding value as an information unit, depending on which value meets a predetermined criterion, so that an error or a potential error in the information unit is concealed.

In accordance with a third aspect, the invention provides a computer program having a program code for performing the method for concealing an error in an erroneous or potentially erroneous information unit, the method including the following steps:

forward-decoding a block of reversible code words of variable lengths which represent a block of information units, the block of code words having a starting point and an end point, the forward-decoder being configured to decode the block in the direction of the end point, starting from the starting point;

backward-decoding the block of code words, starting from the end point, in the direction of the starting point;

determining an error-concealment area, the error-concealment area being given by the forward-decoder providing a decoded forward-decoding value for the information unit, and the backward-decoder providing a decoded backward-decoding value for the information unit, the forward-decoding value and the backward-decoding value deviating from one another for one and the same information unit; and selecting the forward-decoding value or the backward-decoding value as an information unit, depending on which value meets a predetermined criterion, so that an error or a potential error in the information unit is concealed, when the computer program runs on a computer.

The present invention is based on the findings that—if, for reasons of clarity, only a single bit error is assumed—one of the two different values for the information unit which are output by the forward decoder and the backward decoder is the correct value. However, the classical prior-art error concealment techniques do not take these properties into consideration. Here it is assumed that in the case of two different values for the same information unit, a problem has arisen which is to be concealed by eliminating both values at once. In accordance with the invention, however, "discarding" correct values is dispensed with, and instead, both values are examined so as to select that value which seems more plausible as a concealed information unit. In other words, an inventive error concealment device includes a means for selecting the value output by the forward decoder or the value output by the backward decoder as an information unit, dependent on which value meets a predetermined criterion, i.e. is plausible, so that a potential error in the information unit is concealed.

The inventive concept has the advantage that by forward decoding, on the one hand, and by backward decoding, on the other hand, continuation errors with only one erroneous code word in the transmission stream may be completely eliminated if the selection based on the predetermined criterion leads to a correct value. If differential coding has been applied to the information units, even this one erroneous code word may also be completely reconstructed due to the difference information from forward and/or from backward.

What is remarkable here is that the error concealment is, in the event of the occurrence of a single error (provided that there is a correct selection based on the predetermined criterion) is an exact reconstruction which is achieved, in addition, without increasing the data rate, e.g. by means of FEC techniques etc., it being possible to also correctly reconstruct the incorrect code word in the event of underlying differential coding. The expense incurred for error concealment is effected only in the decoder. However, this expanse incurred in the decoder is justifiable if the transmission rate of the transmission channel is a more decisive design option than a decoder which is low in expense. In addition it shall be pointed out that even in the event of FEC coding in the coder, a decoder must be employed which is more expensive than a normal code word decoder.

The plausibility check, i.e. the selection of a value of the pair of values of the two decoders, is performed by means of a previously known property of the information signal, determined by the information units, which may be, e.g., an audio and/or video signal. Scale factors of an audio signal, for example, have the characteristic that they generally do not change very much from one scale factor band to the next. In this case, the predetermined criterion is that the decoder output value which differs less from a latest intact scale factor, or from a scale factor which has already been reconstructed, than the other decoder output value.

In a further embodiment of the present invention, the predetermined criterion used is that the scale factors do not change very much even from block to block, so that the decision as to which of the two decoder output values is the better one is based on a respective scale factor of a preceding block.

However, the predetermined criterion may also be configured in terms of energy. In this case it is assumed that the change in energy from one scale factor band of a previous block to the same scale factor band in the subsequent block or from a scale factor band of the current block to the scale factor band of the next block is relatively small. Unlike the previously described embodiments, in this case the energy of the spectral values in the respective scale factor bands must be determined to be able to perform the plausibility check.

The predetermined criterion may also be selected such that one proceeds not only from one pair of values to the next in the overlap area, but that several or all pairs of values in the overlap area are used. In this case, all potential paths may be constructed through all pairs of values to then select that path which overall comes closest to the predetermined criterion, i.e. has, e.g., the smallest overall change. The overall change is a weighted or unweighted sum of individual changes, i.e. from one pair of values to the next. Alternatively or additionally, a selection of paths may also be performed to discard, for example, the paths wherein a change from, e.g., a forward-decoding value to a backward-decoding value is performed more than once.

Generally speaking, there are many properties previously known of many information signals, to the effect that the signal must, e.g., ascend monotonically, must descend monotonically, changes, or does not change, erratically or gradually or by a certain amount etc. from one point to the next. One of these criteria or several criteria may be jointly used for picking out the correct, or better, value among the two values made available by the forward decoder and the backward decoder.

As has already been set forth, the advantage of the inventive concept is that in the event of only one single bit error, a complete construction may, in principle, be achieved. However, even in the occurrence of several bit errors, concealment may be achieved if the decoder generates a sufficient number of continuation errors in the forward direction and in the backward direction, so that an overlap area, i.e. an error concealment area, develops, wherein two different "suggestions" of the two decoders exist for an information unit of a specific ordinal number. However, a complete reconstruction is not possible in this case, since decoded values which are located between several bit errors are generally not correct.

In a preferred embodiment of the invention, the predetermined criterion depends on a previously known property of an information signal represented by information units from a current, preceding and/or subsequent block, the predetermined criterion being met if a property of the information signal is closer to the previously known property, while considering the value selected, than a property of the information signal, while considering a non-selected value.

BRIEF DESCRIPTION OF THE DRAWINGS

Preferred embodiments of the present invention will be explained below in more detail with reference to the accompanying figures, wherein.

DESCRIPTION OF PREFERRED
EMBODIMENTS

Figure 1:
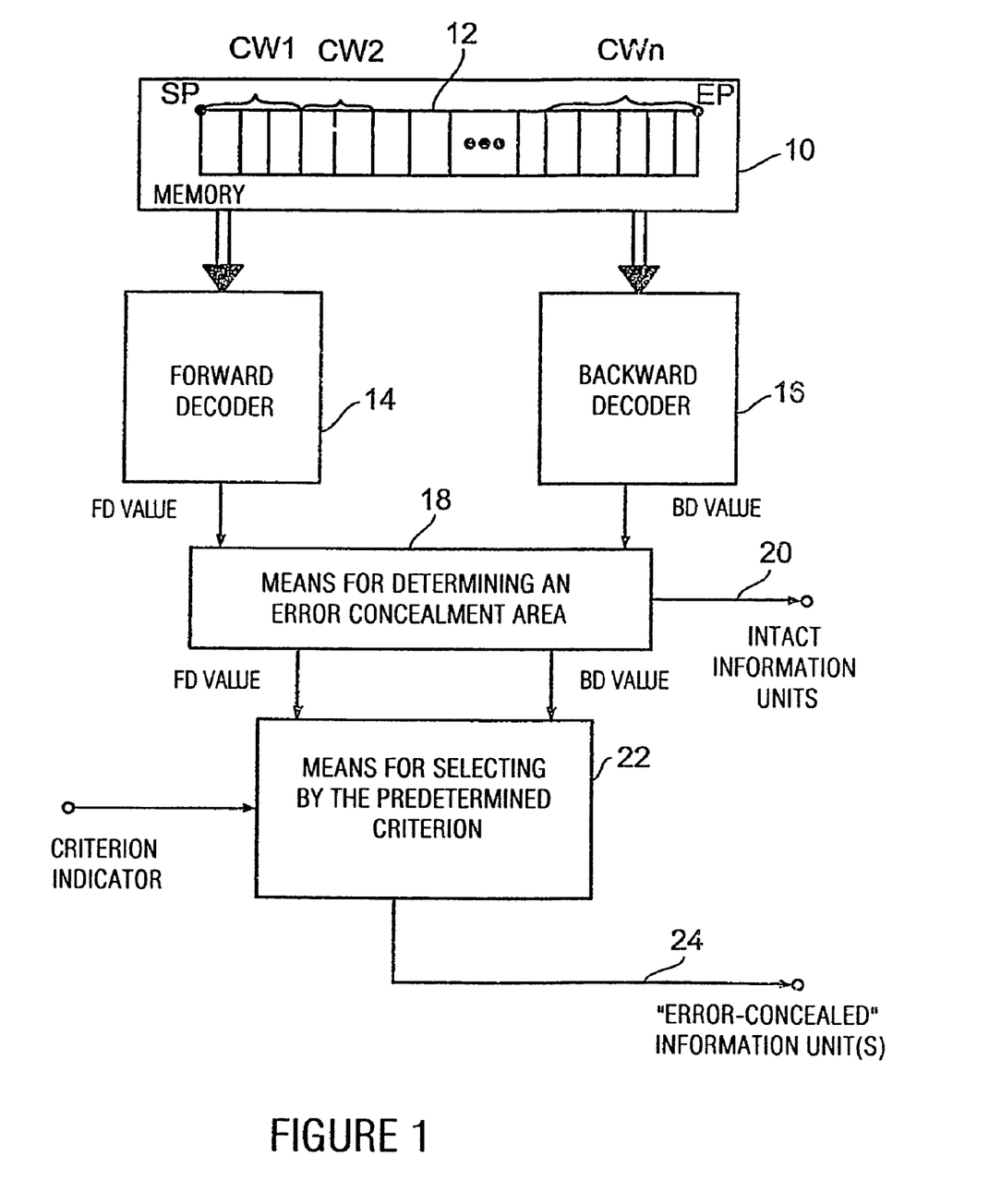
FIG. 1 is a block diagram of an inventive device for error concealment.

FIG. 1 shows a preferred embodiment of an inventive device for error concealment. The device has a memory 10 associated with it, wherein a sequence of bits 12 is stored which represent a block of reversible code words of variable lengths. The first code word CW1 could include, e.g., three bits, whereas the second code word includes only two bits, and the last code word CWn includes, for example, five bits.

Both to a forward decoder 14 and to a backward decoder, bit stream 12 presents itself merely as a sequence of bits, since the start and the end of a code word are contained inherently, but not explicitly, as has been set forth. The forward decoder is configured to start decoding of bit stream 12 starting from a starting point SP, which has been drawn, in FIG. 1, at the left-hand end of the stream, whereas the backward decoder 16 is configured to start decoding of bit stream 12 from an end point EP, drawn, in FIG. 1, on the right-hand end of bit stream 12.

Both forward decoder 14 and backward decoder 16 feed means 18 for determining an error concealment area. In particular, the forward decoder provides a forward-decoding value for the first code word CW1, then a next forward-decoding value for code word CW2, etc. By analogy therewith, the backward decoder provides a backward-decoding value initially for code word CWn and then for code word CW(n−1), etc.

An error concealment area is given if forward decoder 14 and backward decoder 16 provide different output values for one and the same code word. In other words, the error concealment area exists if two different "suggestions" for one and the same information unit are fed to the means for determining an error concealment area.

In this case, a means 22 for selecting, for one code word, either the output of forward decoder 14, i.e. of the forward-decoding value, or the output of backward decoder 16, i.e. of the backward-decoding value, becomes active.

Alternatively, the overlap area is created in that initially only one decoder, i.e. the forward decoder, is operating. Not until it comes across an error and aborts decoding, the other decoder, in the example the backward decoder, is activated, so that even though the backward decoder aborts its work due to an error, an overlap area may have formed.

Means 22 for selecting is configured to select that value of the two alternatives which meets a predetermined criterion, which causes an error or a potential error to be concealed in the information unit and/or, correspondingly, in the code word. Thus, means 22 provides error-concealed information units at its output 24, it being pointed out, however, that this information is error-concealed in an ideal manner, i.e. has been completely reconstructed, if only a single erroneous code word was present in bit stream 12, and if the selection has provided correct values due to the predetermined criterion.

As will be explained below, in a preferred embodiment a criterion indicator exists which is fed to means 22 so as to switch from one predetermined criterion to another predetermined criterion depending on a property of the information signal determined by the information units, the property being indicated by the indicator. Generally, the predetermined criterion will depend on the previously known property of an information signal determined by the information units, the information signal possibly being an audio signal and/or a video signal.

Figure 2:
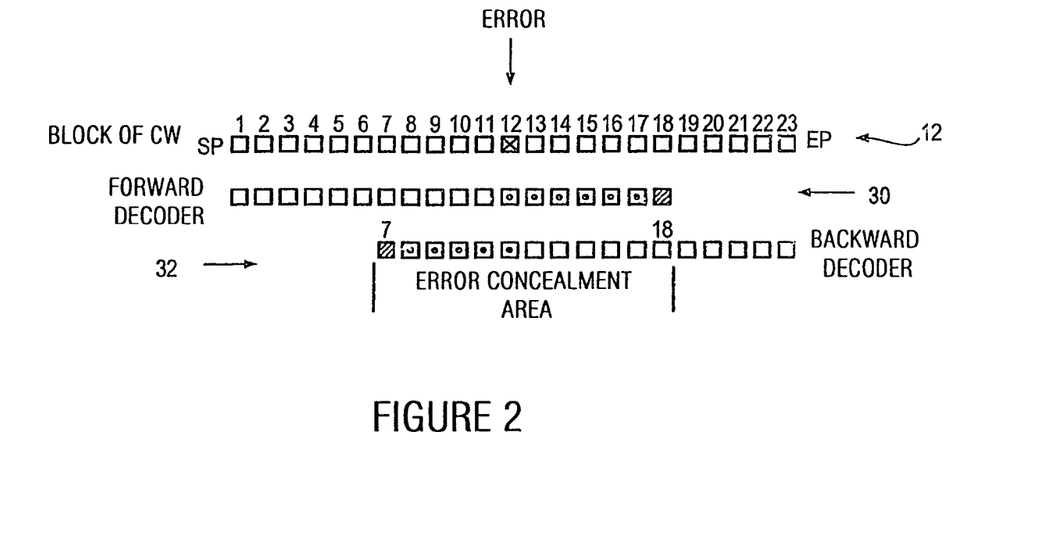
FIG. 2 shows a schematic diagram for depicting the coming into being of an error concealment area by continuation errors both in the forward decoder and in the backward decoder.

FIG. 2 is a more detailed depiction of the starting situation where the inventive error concealment technique becomes relevant. A first line of FIG. 2 depicts the block of reversible code words of variable lengths 12 with a starting point SP and an end point EP, wherein ordinal numbers for the code words of variable lengths are additionally plotted above the code words symbolized by small squares. In the example shown in FIG. 2, the block of code words of variable lengths includes 23 code words in total. The depiction shown in FIG. 2 is only schematic, since the length, in bits, of the individual code words of variable lengths is, of course, not identical for each code word, but differs from code word to code word. In addition, it shall be assumed that in the code word bearing the ordinal number 12, an error has occurred in the transmission of bit stream 12 via an erroneous channel, as is symbolized by a cross in FIG. 2.

Starting from starting point SP, the forward decoder will output forward-decoding values which are correct information units up to the ordinal number 12 and are erroneous only from the ordinal number 12 onwards, as is symbolized by small dots in the respective squares of FIG. 2. Not before ordinal number 18 will the forward decoder come across an invalid, e.g. non-symmetrical, code word which has been caused by bit error 12 but which has led to an invalid code word only for the code word bearing the ordinal number 18, due to the error propagation. The forward decoder will therefore end its output at code word No. 18.

The backward decoder works analogously, it starts at end point EP of block 12 and will provide correct results up to the code word bearing the ordinal number 13 and will provide erroneous results no earlier than from there. In addition, it is assumed that it is not before the code word with the ordinal number 7 that the backward decoder will come across an invalid code word and recognize that somewhere further upstream an error has occurred.

Of course, the decoder is unaware that the error has occurred in code word No. 12. Therefore, it must assume that, in the extreme case, no error propagation has occurred. In other words, this means that the error in code word No. 12 may also have occurred in code word No. 7, on the one hand, or in code word No. 18, on the other hand. The entire area from the code word bearing the ordinal number 7 up to the code word bearing the ordinal number 18, this area representing the error concealment area, is therefore ambiguous.

This may be recognized by means 22 for selecting in that the forward-decoding value differs from the backward-decoding value for a code word of the same ordinal number. Nevertheless, the schematic diagram in FIG. 2 clearly shows that the forward decoder has worked correctly from code word No. 7 up to code word No. 11, and that the backward decoder also has worked correctly from code word No. 18 up to code word No. 13. These findings are utilized, in accordance with the invention, to no longer discard, interpolating or otherwise replacing the entire error concealment area, but to examine the individual pairs of values for ordinal numbers 7 to 18 so as to select, in each case, that value which meets the predetermined criterion.

Figure 3:
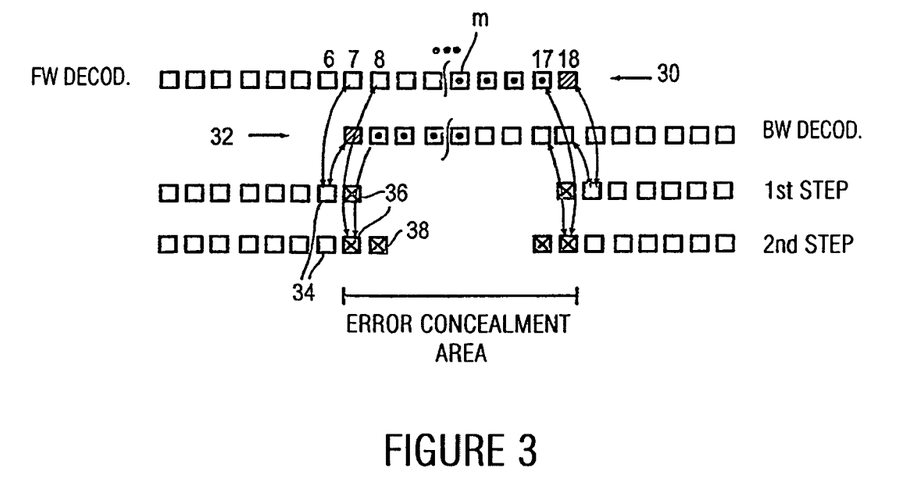
FIG. 3 shows an elementary schematic diagram for depicting the inventive error concealment, wherein the predetermined criterion is performed on the basis of an information unit which was last correctly decoded or of an information unit which was last concealed and is possibly correct.
Figure 4:
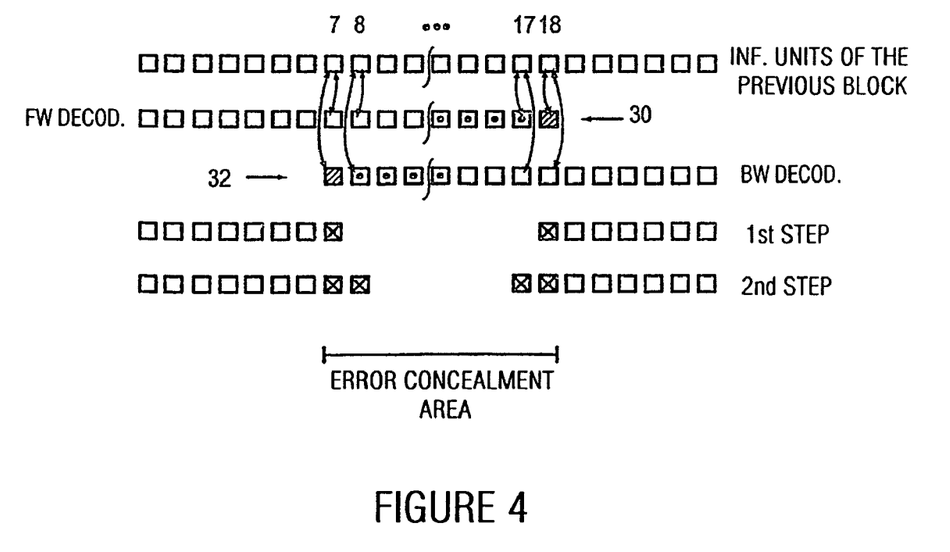
FIG. 4 an elementary schematic diagram in accordance with an alternative embodiment of the present invention, wherein a block of decoded information units, which is preceding in time, provides a basis for the predetermined criterion.

FIGS. 3 and 4, which will be set forth below, show two different predetermined criteria which may be used, e.g., depending on the criterion indicator of FIG. 1 so as to achieve error concealment. In a preferred embodiment of the present invention, the information units coded by the code words of variable lengths are scale factors of an MPEG-standard coded audio signal. A predetermined property of audio signals is that scale factors generally do not change very much from one scale factor band to the next, i.e. from one scale factor to the next scale factor which is adjacent to it in terms of frequency. In other words this means that small changes between successive scale factors are more likely than big changes.

The predetermined criterion in the example shown in FIG. 3 thus is that both the forward-decoding value for the code word bearing the ordinal number 7 and/or for the information unit bearing the ordinal number 7, and the backward-decoding value for the code word and/or the information unit bearing the ordinal number 7 are compared with a threshold value as a reference, the threshold value used being the latest scale factor designated by 34 in FIG. 3. This means that that value which is closer to the scale factor 34 for ordinal number 6 is used as an "error-concealed" scale factor 36.

After this comparison, a first step is terminated, and a second step is started so as to perform error concealment also for the code word bearing ordinal number 8. For this purpose, both suggestions of the forward decoder and of the backward decoder for code word 8 are taken and compared with the scale factor 36 just reconstructed so as to generate a further error-concealed, i.e. reconstructed scale factor 38. The same is performed analogously by the other side of the error-concealment area until both sides come across a mean scale factor m if same exists.

Sometimes the error-concealed value generated from the left-hand side approximation will differ from the error-concealed value generated by the right-hand side approximation. One of the two values could be chosen at random. Alternatively, however, it is preferred in this case to take a mean value from these two values, or to take any value located between those two values. This value for the mean ordinal number m is very likely to be an incorrect value which, however, will not lead to any major deviation, since, after all, it was formed on the basis of reconstructed values to the left and to the right of the ordinal number m.

As has been set forth, the predetermined criterion may be performed on the basis of the previous or subsequent scale factor in the direction of frequency. An alternative possibility is depicted in FIG. 4. In FIG. 4, the predetermined criterion is not determined on the basis of the scale factor, which is adjacent in terms of frequency, from the current block, but on the basis of the scale factor with the same ordinal number, from the previous block. Again, both suggestions made by the forward decoder and by the backward decoder are compared with the scale factor of the same ordinal number of the previous block, so as to then accept that suggestion that differs less from the scale factor of the previous block, since, as has been indicated, in very many cases scale factors only change to a limited extent from block to block.

A selection between the predetermined criterion depicted in FIG. 3 and the predetermined criterion depicted in FIG. 4 may be performed on the basis of the criterion indicator. For example, the criterion indicator may be given as side information to the bit stream generated by the coder, so as to indicate, e.g. for each block, whether or not the scale factors greatly change, in terms of scale factor bands, in this block or with regard to a block adjacent in time. If the scale factors greatly change in a current block, the predetermined criterion depicted in FIG. 3 will not work so well. In this case, the criterion depicted in FIG. 4 will possibly work better, so that for such a block, the criterion indicator will be such that means 22 is initialized in such a manner that it applies the error-concealment criterion depicted in FIG. 4 which is based on the previous block rather than on scale factors adjacent in terms of frequency, as in FIG. 3.

In an alternative embodiment, the predetermined criterion is solved, by the scale factors, in that the scale factors alone are no longer considered the threshold value for the predetermined criterion, but energies are looked at in scale factor bands. Means 22 for selecting is therefore configured to determine the energies of scale factor bands which are either adjacent to one another or successive in time, using the spectral values which have also been decoded, so as to then take that scale factor suggestion which results in the small change in energy.

In alternative embodiments, the predetermined criterion is not only determined for a pair of values in the error-concealment area, but for several pairs in common. Here, the means for selecting is configured to determine an overall property for a plurality of different paths in the error-concealment area. Each path passes between different forward and backward-decoding values in different "zigzag paths". The means for selecting here is configured to select the decoding values located on the path having an overall property which corresponds to the predetermined criterion. Here, the overall property is a weighted or unweighted sum of individual properties of the path.

Alternatively or additionally, only such a path will be taken into consideration which precisely exhibits a change from a forward-decoding value to a backward-decoding value or vice versa. This embodiment takes into account that when only one single error is present, only one single change can occur.

If the operation is not based on paths, but is effected from pair of values to pair of values, the above findings may be exploited to not perform a second change in the case of an existing change, but to select such decoding values which require no further change, regardless of the predetermined criterion.

It shall be pointed out that the predetermined criterion may be based on any information which, in modern coding methods, is contained in the data stream anyhow, the information allowing a statement to be made about a property of the quantity to be reconstructed. In the example of audio signals, such information is L/R and/or M/S stereo information which is also an indicator of whether the information in both stereo channels differs very much or is similar and therefore also reflects a rough measure of signal statistics and therefore defines a previously known property of the information signal.

Depending on the circumstances, the inventive error-concealment method may be implemented in hardware or in software. The implementation may be effected on a digital storage medium, in particular a disc or CD with electronically readable control signals which may cooperate with a programmable computer system such that the respective method is performed. Generally, the invention thus also consists in a computer program product with a program code, which is stored on a machine-readable carrier, for performing the inventive method when the computer program product runs on a computer. In other words, the invention may thus be realized as a computer program having a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for concealing an error in an erroneous or potentially erroneous information unit, the device comprising:

a forward-decoder for forward-decoding a block of reversible code words of variable lengths which represent a block of information units, the block of code words having a starting point and an end point, the forward-decoder being configured to decode the block in the direction of the end point, starting from the starting point;

a backward-decoder for backward-decoding the block of code words, starting from the end point, in the direction of the starting point;

a determinator for determining an error-concealment area, the error-concealment area being given by the forward-decoder providing a decoded forward-decoding value for the information unit, and the backward-decoder providing a decoded backward-decoding value for the information unit, the forward-decoding value and the backward-decoding value deviating from one another for one and the same information unit; and a selector for selecting the forward-decoding value or the backward-decoding value as an information unit, depending on which value meets a predetermined criterion, so that an error or a potential error in the information unit is concealed.

2. Device as claimed in claim 1, wherein the selector is configured to use a threshold value, on the basis of which the predetermined criterion is set.

3. The device as claimed in claim 2,
wherein the selector is configured to use, as a threshold value, an intact information unit adjacent to the information unit, or an information unit reconstructed in a preceding step, and
the predetermined criterion being set such that that value which is closer to the threshold value or, alternatively, is further away from the threshold value is selected as an information unit.

4. The device as claimed in claim 1,
wherein :the error-concealment area comprises a plurality of forward-decoding values and backward-decoding values.

5. The devices as claimed in claim 1,
wherein the selector is configured to select a value as an information unit both for a pair of a forward-decoding value and a backward-decoding value having a lower ordinal number in the error-concealment area and for a pair of a forward-decoding value and a backward-decoding value having a higher ordinal number in the error-concealment area.

6. The device as claimed in claim 5,
wherein the selector is configured to use a threshold value on the basis of the information unit with an ordinal number lower by 1 for a selection from the pair with the lower ordinal number, and
to use a threshold value on the basis of the information unit with an ordinal number higher by 1 for a selection from the pair with the higher ordinal number.

7. The device as claimed in claim 5,
wherein the selector is configured to select information units in a step-by-step manner from the smaller ordinal number to a higher ordinal number and from the higher ordinal number to a smaller ordinal number.

8. The device as claimed in claim 5,
wherein the selector is configured to determine, in the event that the information units selected from two pairs have the same ordinal number and are different from one another, a third information unit whose value is between the information units selected.

9. The device as claimed in claim 8,
wherein the third information unit is a mean value from the two information units selected.

10. The device as claimed in claim 1,
wherein at least one preceding block or subsequent block of decoded information units is present, and
wherein the predetermined criterion depends on the preceding or subsequent block.

11. The device as claimed in claim 10,
wherein the selector is configured to use a threshold value, on the basis of which the predetermined criterion is set, the threshold value used being an information unit of the preceding block or subsequent block with an ordinal number close to the ordinal number or preferably identical with the ordinal number of the information unit to be selected.

12. The device as claimed in claim 1,
wherein the predetermined criterion is defined in that a change from an information unit to an information unit adjacent in the block or to an information unit of a preceding or subsequent block of information units of the same ordinal number is small.

13. The device as claimed in claim 1,
wherein the information unit by itself or in connection with a further quantity represents a property, and wherein the predetermined criterion is defined such that a change in property is small.

14. The device as claimed in clam 13,
wherein the property is an energy.

15. The device as claimed in claim in 14,
wherein the change in energy is defined in two successive blocks with regard to a change between two adjacent information units of the same block or two information units of the same ordinal number.

16. The device as claimed in claim 1,
wherein the information units are scale factors of an audio signal, the scale factors being differentially coded in addition to a coding using code words of variable length, so that a code word of variable length represents a differentially coded scale factor.

17. The device as claimed in claim 16,
wherein the predetermined criterion is defined such that a change in energy to a scale factor band adjacent in terms of frequency or to a scale factor band with the same ordinal number from a block which is preceding in time or successive in time is small.

18. The device as claimed in claim 1,
wherein the block of reversible code words of variable lengths has a criterion indicator associated with it, the selector being configured to switch from a first to a second predetermined criterion depending on the criterion indicator.

19. The device as claimed in claim 1,
wherein the predetermined criterion depends on a previously known property of an information signal determined by the information units.

20. The device as claimed in claim 19.
wherein the information signal is an audio signal and/or a video signal.

21. The device as claimed in claim 1,
wherein the selector is configured to determine an overall property for an plurality of different paths in the error-concealment area, each path extending between different forward-and backward-decoding values, and the selector being configured to select those decoding values which lie on the path that has an overall property which corresponds to the predetermined criterion.

22. The device as claimed in claim 21, wherein the selector takes into account only a path which precisely exhibits a change from a forward-decoding value to a backward-decoding value or vice versa.

23. The device as claimed in claim 1:
wherein the selector is configured to detect whether a change has already occurred in a selection in an error-concealment area with several pairs of forward-decoding values and backward-decoding values, and
wherein the selector is configured to select, in the event of a change for information units following the change, regardless of the predetermined criterion, such decoding values which require no further change.

24. A method for concealing an error in an erroneous or potentially erroneous information unit, the method comprising:
forward-decoding a block of reversible code words of variable lengths which represent a block of information units, the block of code words having a starting point and an end point, the forward-decoder being configured to decode the block in the direction of the end, point, starting from the starting point;
backward-decoding the block of code words, starting from the end point, in the direction of the starting point;
determining an error-concealment area, the error-concealment area being given by the forward-decoder providing a decoded forward-decoding value, for the information unit, and the backward-decoder providing a decoded backward-decoding value for the information unit, the forward-decoding value and the backward-decoding value deviating from one another for one and the same information unit; and
selecting the forward-decoding value or the backward-decoding value as an information unit, depending on which value meets a predetermined criterion, so that an error or a potential error in the information unit is concealed.

25. At least one computer readable medium containing a computer program product comprising program code for performing the method for concealing an error in an erroneous or potentially erroneous information unit, the method comprising:
forward-decoding a block of reversible code words of variable lengths which represent a block of information units, the block of code words having a, starting point and an end point, the forward-decoder being configured to decode the block in the direction of the end point, starting from the starting point;
backward-decoding the block of code words, starting from the end point, in the direction of the starting point;
determining an error-concealment area, the error-concealment area being given by the forward-decoder providing a decoded forward-decoding value for the information unit, and the backward-decoder providing a decoded backward-decoding value for the information unit, the forward-decoding value and the backward-decoding value deviating from one another for one and the same information unit; and
selecting the forward-decoding value or the backward-decoding value as an information unit, depending on which value meets a predetermined criterion, so that an error or a potential error in the information unit is concealed,
when the computer program runs on a computer.

* * * * *